United States Patent [19]

Mori et al.

[11] 3,975,832

[45] Aug. 24, 1976

[54] HOT AIR DRYING MACHINE

[75] Inventors: Kunihito Mori, Toyonaka; Akira Kobayashi, Kobe; Yoshinobu Kishimoto, Amagasaki; Yukinobu Ohmichi, Takatsuki; Masatatsu Nakamura, Osaka, all of Japan

[73] Assignee: Matsushita Electric Industrial Co., Ltd., Japan

[22] Filed: Dec. 20, 1974

[21] Appl. No.: 535,027

[30] Foreign Application Priority Data
Dec. 26, 1973 Japan.................................. 48-2748

[52] U.S. Cl. ........................................ 34/53; 34/55
[51] Int. Cl.² ........................................ F26B 11/04
[58] Field of Search............................ 34/48, 53, 55; 338/22 R

[56] References Cited
UNITED STATES PATENTS

| | | | |
|---|---|---|---|
| 3,186,105 | 6/1965 | Nye, Jr. et al. | 34/48 |
| 3,242,585 | 3/1966 | Worst | 34/48 |
| 3,526,968 | 9/1970 | Triplett | 34/48 |
| 3,599,342 | 8/1971 | Cotton | 34/48 |
| 3,701,884 | 10/1972 | Finney | 338/22 R |

*Primary Examiner*—John J. Camby
*Assistant Examiner*—Larry I. Schwartz
*Attorney, Agent, or Firm*—Wenderoth, Lind & Ponack

[57] ABSTRACT

A hot air drying machine for drying materials, such as clothes or the like, includes a drum for materials to be dried rotatably supported in a housing, a fan casing communicated with the drum and enclosing therein a fan rotated simultaneously with the drum by a driving motor, and heaters for heating air sucked into the housing from exterior thereof. The drying machine further includes an electrical control circuit connected to a first temperature sensing element for hot exhaust air and a second temperature sensing element for the cool outside air sucked into the housing with the operational ratio of the first sensing element to the second sensing element adapted to vary depending on the power source voltage fluctuation for achieving uniform drying rates regardless of the variations of the power source voltage.

12 Claims, 11 Drawing Figures

HOT AIR DRYING MACHINE

BACKGROUND OF THE INVENTION

The invention relates to a drying machine, and more particularly to a hot air drying machine for drying clothes or the like.

Conventionally, in drying machines for the above described purpose, it has been a general practice to adjust the time required for drying clothes or the like by setting a suitable time control device, for example, a timer to a desired time, since such time for drying differs depending on the kinds and amount of materials to be dried and also on variations of room temperatures and power source voltage, which drying time, however, must inevitably be determined by experience and is consequently very uneconomical from the view point of efficiency and processing cost, sometimes resulting in damage to the materials to be dried due to over-drying or making it necessary to dry such materials again if the drying operation is stopped with the materials insufficiently dried due to the period of drying time set in advance being too short.

In order to overcome such disadvantages, there was conventionally been proposed a drying machine equipped with a control device for controlling the drying rate by detecting the relative difference of the exhaust air temperature and the ambient temperature for the drying machine through temperature sensing elements respectively. However, such a conventional drying maching still has such drawbacks that the drying operation is stopped before sufficient drying is achieved due to insufficient rates in temperature rise of exhaust air especially when the power source voltage varies, for example, when the power source voltage is high, thus adversely affecting the efficient drying operation and stable drying rates of the dried materials.

Furthermore, in such conventional drying machines with unstable drying rates mainly due to variations of power source voltage, it is almost impossible to complete the drying operation with the materials to be dried kept exactly in a predetermined damp condition in cases where such a degree of partial drying is desired depending on the requirements, for example, for subjecting the dried materials to subsequent processings in such accurately partially damp condition.

SUMMARY OF THE INVENTION

Accordingly, an essential object of the present invention is to provide a hot air drying machine for drying clothes or the like having control means by which a stable drying rate without fluctuation is achieved irrespective of variations of power source voltage with substantial elimination of the disadvantages inherent in the conventional drying machines.

Another important object of the present invention is to provide a hot air drying machine of the above described type whose drying operation can be completed with the materials to be dried kept in a desired damp condition if necessary, depending on the requirements.

A further object of the present invention is to provide a hot air drying machine of the above described type in which a temperature sensing element is incorporated to delay the time of duration of the drying operation for improving the drying rate at a predetermined operational ratio irrespective of the amount of materials to be dried.

A still further object of the present invention is to provide a hot air drying machine of the above described type in which a delay thermostat is incorporated to turn heaters on and off repeatedly for lengthening the time for a temperature sensing element to reach a predetermined operational ratio in order to improve the drying rates of the materials to be dried.

Another object of the present invention is to provide a hot air drying machine of the above described type in which the optimum drying condition of the materials to be dried is always achieved with simple construction and subsequent low cost.

According to a preferred embodiment of the present invention, the drying machine comprises a housing having in the front wall thereof an opening provided with a releasable door to receive materials to be dried, a drum rotatably supported in the housing with one side wall of the drum formed with an opening corresponding to the opening of the housing, and with many holes for air circulation formed around the opening of the drum, while the other side wall of the drum having an exhaust opening is centrally provided with a drum shaft which is rotatably received in a bearing fixed on a fan casing which is secured to the rear wall of the machine housing. The fan casing having an exhaust opening in a position corresponding to the exhaust opening of the drum side wall includes a fan therein which is rotated by conventional driving means simultaneously with the drum, and the gap between the drum side wall and the fan casing is suitably made air tight except for the exhaust openings communicating with each other. The fan casing is provided with another exhaust opening at the upper portion of the rear wall of the housing, while an suction opening is formed in the rear wall of the housing adjacent to the driving means provided at the lower portion of the housing. Inside the housing below the openings of the housing and the drum, heaters are disposed for heating the cool air sucked in from the suction opening formed in the rear wall of the housing. Adjacent to the heater, a delay thermostat for cool air is disposed, while a second temperature sensing element and an electrical control unit are installed at the lower portion of the housing between the air suction opening and the heaters, with a first temperature sensing element attached to the outer wall of the fan casing in the housing close to the exhaust opening for the fan casing formed in the upper portion of the rear wall of the housing.

As the air is sucked in, upon rotation of the fan and the drum, through the air suction opening at the lower portion of the rear wall of the housing, heated by the heaters, sucked into the drum with materials to be dried therein, introduced into the fan casing through the openings of the drum and the fan casing and finally discharged out of the exhaust opening in the rear wall of the housing at the upper portion of the fan casing, the operational ratio of the first temperature sensing element whose resistance value varies according to the temperature of exhaust air through the drum and fan casing to the second temperature sensing element whose resistance value varies according to the outside air sucked in is adapted to be varied depending on the power source voltage variations for obtaining uniform drying rates regardless of the power source voltage fluctuation. Additionally, auxiliary resistances with different resistance values are connected in series with the first temperature sensing element so that these auxiliary resistances are selectively switched over for enabling the drying operation to be completed with the materials to be dried kept in a predetermined damp condition. Furthermore, since the first temperature sensing element is preliminarily molded in an insulating material which is attached to the outer wall of the fan casing for time-delay purpose, the drying rate at a predetermined operational ratio is advantageously improved irrespective of the amount of the materials to be dried. The delay thermostat disposed adjacent to the heaters, which thermostat is adapted to function when the temperature or the power source voltage rise, is also effective for improving the drying rates of the materials to be dried by energizing the heaters intermittently and thus lengthening the time for the first and second temperature elements to reach the predetermined operational rate.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like numerals throughout the several views of the accompanying drawings.

Referring to FIGS. 1 to 4, there is shown a hot-air drying machine H in which the drying control device of the invention is incorporated. A circular opening 2 for receiving clothes or the like to be dried is formed in the central portion of a front wall 1a of a housing 1 for the machine H with the peripheral edge 3 of the opening 2 bent inward to extend to a certain extent at right angles from the surface of the front wall 1a. A door 4 releasably fits into the opening 2 with a gasket 5 disposed between the opening 2 and the door 4 for close contact therebetween. A central portion on one side of a drum 6 corresponding to the opening 2 of the housing 1 is outwardly raised toward the opening 2 to a certain extent to define an opening 6a, with the peripheral edge of the opening 6a extending toward the opening 2 to surround the peripheral edge of the latter in spaced relation thereto, and with a plurality of hot air suction holes 37 formed around the opening 6a, while the other side of the drum 6 remote from the opening 6a thereof is provided with a portion 6b which has hot air exhaust openings 38 and which is slightly raised outwardly from the surface of such other side in a position corresponding to the opening 6a, with a drum shaft 25 fixedly mounted, through a clamping member 26, on the central portion of the raised portion 6b, the axis of the shaft 25 being adapted to coincide with the axis of the drum 6. The drum shaft 25 is rotatably received in a drum bearing 27 fixedly mounted on a fan casing 21 which is secured to a rear wall 1b of the housing 1. Inside the drum 6, a plate member 6d of dishlike cross section having many small openings $O_2$ for air circulation formed therein is fixedly received in the raised portion 6b. A plurality of baffle plates 28, for example, three of such plates are radially fixed to the inner surface of the circumference of the drum 6 at equal intervals to one another for better rotation of the clothes or the like to be dried within the drum 6. The fan casing 21 having openings 39 at positions corresponding to the exhaust openings 38 of the drum 6 forms a passage for hot air together with the wall 1b of the housing 1, with an exhaust opening 23 formed in the wall 1b of the housing 1 at an upper portion of the fan casing 21, which opening 23 is further provided with a guide plate 22 for guiding the hot air passing through the opening 23. A sealing material 35, for example, of felt, is fixed to the outer periphery of the raised portion 6b on the side plate of the drum 6 so that the sealing material 35 rotates as the drum 6 rotates with the sealing material 35 pressed against the surface of the fan casing 21 for preventing leakage of air therebetween. Inside the fan casing 21, a fan 17 is fixedly mounted on one end of a shaft 17' which is rotatably supported on a bearing 24 secured to the rear wall 1b of the housing H with the axis of the shaft 17' aligned with the axis of the drum shaft 25 and with a pulley 20 secured to the other end of the shaft 17' extending through the rear wall 1b of the housing 1. A driving motor 13 is suitably secured to the bottom plate 1c of the housing 1 through a supporting member 14 and is adapted to rotate upon turning on a main switch 44 mounted on the upper portion of the front wall 1a of the housing 1. At one end of a shaft 13a of the motor 13, a pulley 15 for drum rotation is fixedly mounted with a belt 16 directed over the pulley 15 and the drum 6, while another pulley 18 is secured to the other end of the motor shaft 13a, which pulley 18 is connected to the pulley 20 of the fan 17 through a belt 19. The portion of the rear wall 1b of the housing 1 through which the motor shaft 13a extends is formed with an opening 1d for air circulation, while the pulleys 20 and 18 connected with the belt 19 are enclosed in a cover plate C fixed to the back surface of the rear wall 1b of the housing 1 with many openings $O_1$ formed in the plate C in positions adjacent to the motor pulley 18 for sucking in the air.

Figure 1:
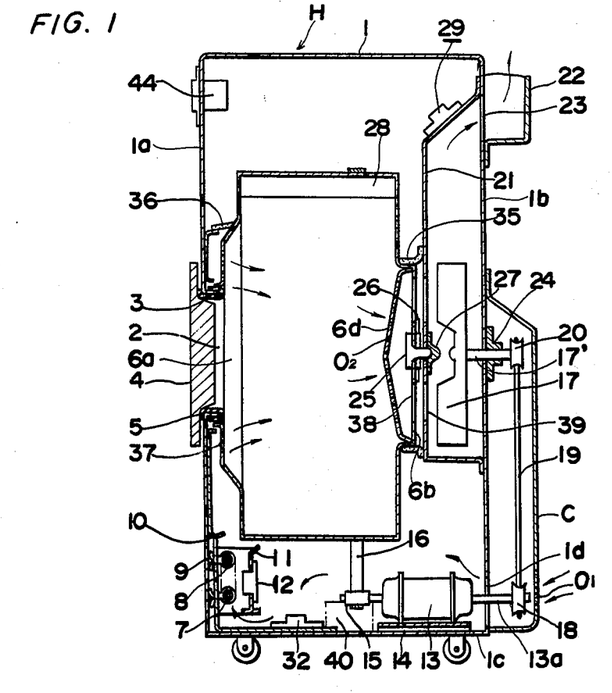
FIG. 1 is a schematic diagram showing a sectional side view of a drying machine according to the present invention.
Figure 2:
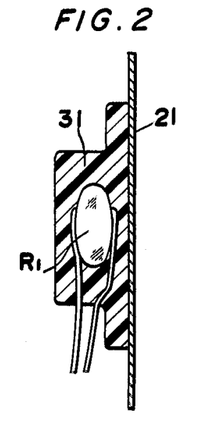
FIG. 2 is a cross-sectional view, on an enlarged scale, of a first temperature sensing portion employed in the machine of FIG. 1.
Figure 3:
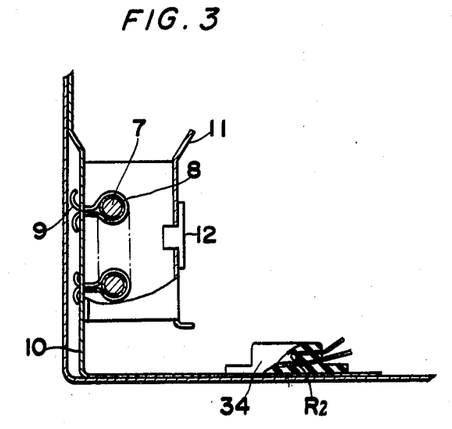
FIG. 3 is a side elevational view, on an enlarged scale, of heaters and a second temperature sensing portion, partly in section, employed in the machine of FIG. 1.

Heaters 7 for drying are fixedly mounted, in the housing 1 below the opening 2 thereof, to a supporting frame 10 of the housing 1 by supported members 9 through insulating material 8. The supporting frame 10 is secured to the inner surfaces of the front side wall 1a and the bottom plate 1c of the housing 1 and has an opening which further surrounds the projecting peripheral edge of the opening 6a of the drum 6 in spaced relation to the latter with a sealing plate 36, for example, of felt secured to a part of the frame 10 above the opening 2. The sealing plate 36 is adapged to press against the surface of the drum 6 in a position beyond the suction holes 37 formed around the opening 6a of the drum 6 and is intended to form part of a passage for sending the hot air effectively into the hot air suction holes 37 of the drum 6. A heat shielding plate 11 of an L-shaped cross section is also fixed to the supporting frame 10 in a position adjacent to the heaters 7, with a delay thermostat 12 for cool air secured to the central portion of the surface of the plate 11 extending in parallel direction to the front wall 1a of the housing 1, which thermostat 12 is adapted to open when the temperature of the air flow falls below 40°C and to close when the temperature of the same rises above 55°C.

It should be noted here that in the drying machine H described above, air circulation therethrough as the fan 17 rotates is such that the air sucked in through the openings $O_1$ formed at the lower portion of the cover plate C is diected toward the heaters 7 through the lower portion of the housing 1 as shown by arrows in FIG. 1, heated by the heaters 7, sucked into the drum 6 through the openings 37 thereof, led into the fan casing 21 through the openings $O_2$ formed in the dish-like plate 6d in the drum 6 and through the hot air exhaust openings 38 of the drum 6 and the openings 39 of the fan casing 21, and then discharged out of the machine H through the fan casing 21 and through the exhaust opening 23 formed in the rear wall 1b of the housing 1 at the upper portion of the fan casing 21.

A temperature sensing portion 29 is provided, within the housing 1, on the upper wall of the fan casing 21 close to the exhaust opening 23 for sensing the temperature of the exhaust air. The sensing portion 29 comprises a temperature sensing element, for example, a thermistor $R_1$ molded in an electrical insulator 31, for example, of heat-resistant resin (FIG. 2), which insulator 31 is suitably fixed to the outer wall of the fan casing 21.

Another temperature sensing portion 32 is secured to the supporting frame 10 at the bottom of the housing 1 in a position between the heater 7 and the motor 13 for mainly sensing the temperature within the housing 1. The sensing portion 32 also comprises a temperature sensing element, such as a thermistor $R_2$ molded in an electrical insulator 34, for example, of heat-resistant resin (FIG. 3), which insulator 34 is suitably secured to the supporting frame 10, for example, by securing screws and is adapted to receive heat radiation from the drying heaters 7.

Figure 4:
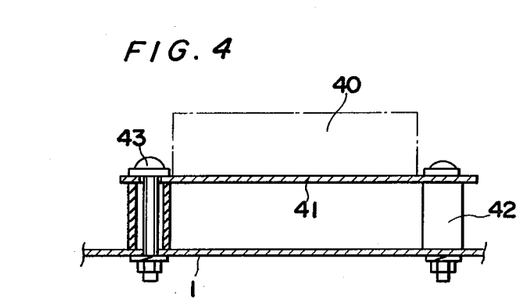
FIG. 4 is a side elevational view, on an enlarged scale partly in section, showing attachment of a control unit employed in the drying machine of FIG. 1.

A control unit 40 constituting the main part of the drying machine of the invention is disposed at the lower portion of the housing 1 between the sensing portion 32 and the motor 13, and is mounted on an insulating plate 41, for example, of phenolic resin, which plate 41 is spaced away from the bottom plate 1c of the housing 1, for example, by a pair of insulating tubes, through which securing screws 43 are passed to secure the unit 40 to the bottom plate 1c as shown in FIG. 4.

It should be noted here that the position of the temperature sensing portion 29 comprising the thermistor $R_1$ molded in the insulating material 31 is not limited to the upper portion of the fan casing 21, but that the same may be installed at any other suitable place in the drying machine H. For example, the temperature sensing portion 29 may be attached to one of the baffle plates 28 of the drum 6 as shown in FIGS. 5 and 6.

Figures 5, 7:
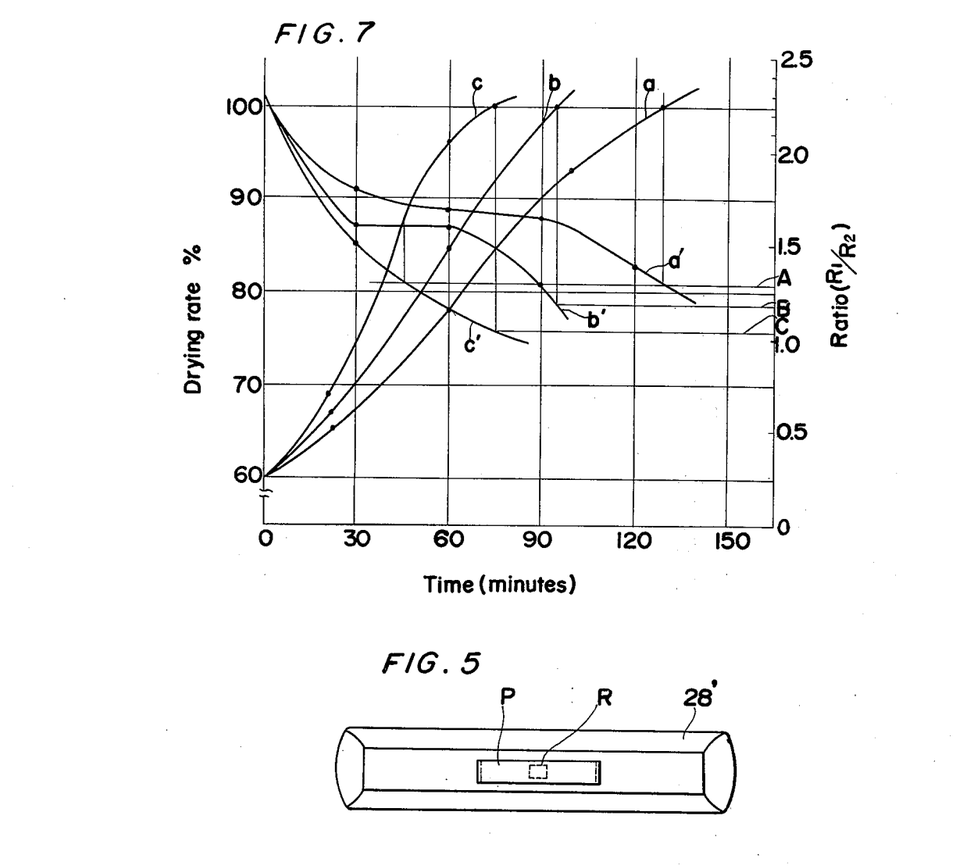
FIG. 5 is a top plan view, on an enlarged scale, showing a modification of a baffle plate of a drum of the drying machine of FIG. 1.
FIG. 7 is a graph showing the relation between the drying rate and the ratio of a first temperature sensing element to a second temperature sensing element.
Figure 6:
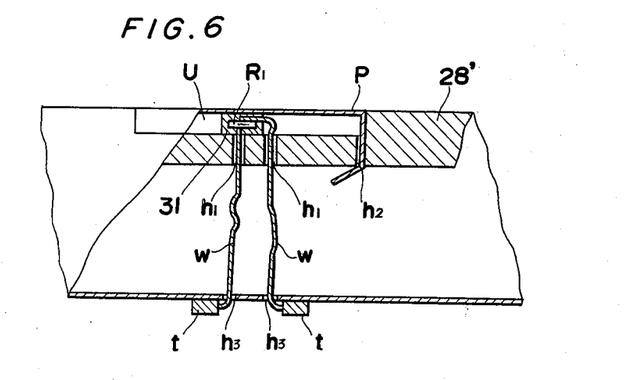
FIG. 6 is a side view, on a still enlarged scale in partial section, of an essential part of the baffle plate in FIG. 5.

In the modification of FIGS. 5 and 6, the baffle plate 28' made of an electrically insulating material is formed with a recess u in the central portion thereof to receive the thermistor $R_1$ molded in the insulating material 31. The recess is further provided at the bottom portion thereof with a pair of openings $h_1$ for lead wires w and another pair of slits $h_2$ for the legs of a cover plate p to pass therethrough. The thermistor $R_1$ molded in the insulator 31 is placed in the recess with one side of the insulator 31 contacting the bottom of the recess u and with the other side of the insulator 31 contacting the cover plate p of electrically conductive material, for example, of aluminum, copper, etc. The presence of the cover plate p prevents clothes or the like to be dried from directly contacting the thermistor $R_1$, and is also effective for protecting the thermistor $R_1$ from the effect of moisture in the drum 6. For fixing the cover plate p on the recess u, the legs of the cover plate p are inserted into the slits $h_2$ of the recess u and suitably bent to hold the cover plate p in position. A pair of openings $h_3$ are formed in the drum 6 is positions corresponding to the openings $h_1$ in the recess u of the baffle plate 28' for passing the lead wires w therethrough. A pair of electrodes t, e.g. in the form of belts, are mounted on the outer periphery of the drum 6 in spaced relation to each other, which electrodes t are connected to the thermistor $R_1$ in the recess u through the lead wires w.

By this arrangement, when the main switch 44 is turned on with the drum 6 loaded with materials to be dried, such as clothes or the like, the motor 13 is rotated and simultaneously the heaters 7 are energized, which motor 13 in turn rotates the drum 6 and the fan 17 with air circulated within the housing 1 in the manner as described earlier for the drying operation.

Referring to FIG. 7, there is shown the relation between the drying rate and the ratio $R_1/R_2$ of the thermistor $R_1$ whose resistance varies with the temperature of the exhaust air to the thermistor $R_2$ whose resistance is dependent on the temperature of air sucked in and of the heaters 7. The curve a represents the drying rate at a voltage of 85 volts, the curve b at 100 volts and the curve c at 110 volts. The curve a' shows the variation of the ration $R_1/R_2$ of the thermistor $R_1$ to the thermistor $R_2$ at 85 volts, the curve b' at 100 volts, and the curve c' at 100 volts.

When the drying machine H is operated and finishes drying at the ratio A, irrespective of the variations of the voltage of the power source as in conventional drying machines, a desired degree of drying with drying rate of 100 percent may be achieved at the voltage of 85 volts. However, if the voltage rises higher than this level, the drying rate tends to be remarkably declined, in which case, for example, under the conditions of a clothes load of 2kg at a room temperature of 20°C, the drying rates will be 98percent at 100 volts and 89 percent at 110 volts. The cause for such variations in the drying rates are attributable to a rapid increase of the temperature of the exhaust air as the voltage rises, and in order to achieve predetermined drying rates regardless of the voltage variations, it is necessary to alter the ratio of operation according to the variations of the power source voltage as in the control circuit of the invention described hereinbelow.

Figure 8:
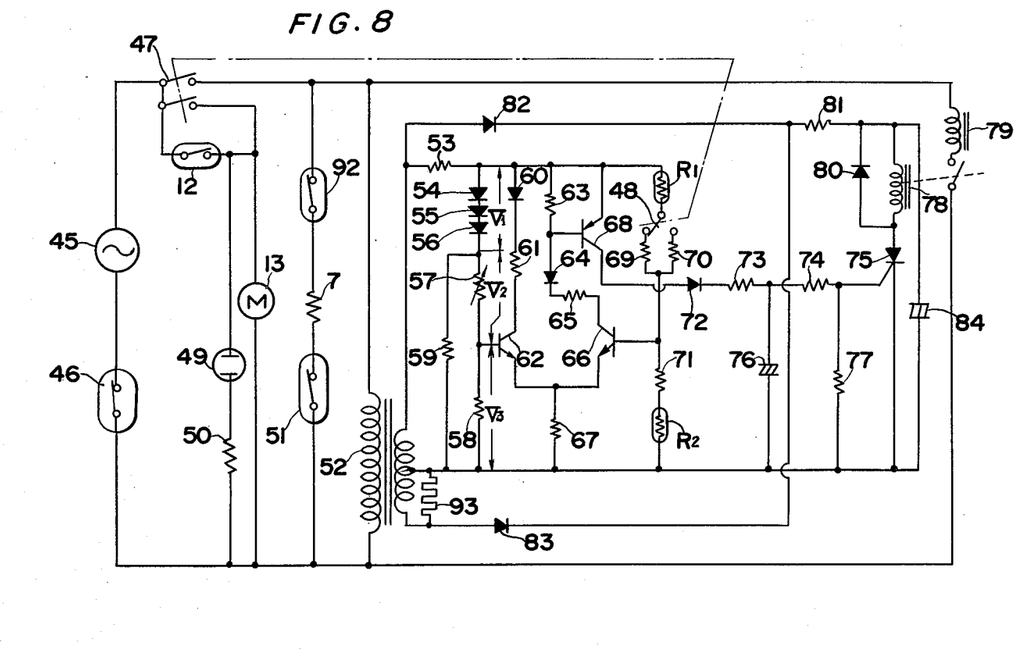
FIG. 8 is an electrical circuit diagram incorporating a control circuit of the drying machine according to the present invention.

Referring to FIG. 8, there is shown an electrical circuit diagram of the drying machine incorporating the control unit 40 of the invention. The circuit includes a door switch 46 connected in series with a power source 45, starting buttons 47 and 48 forming the starting switch 44, the delay thermostat 12 connected in series with a neon lamp 49 and a resistance 50, the motor 13 and the heaters 7 connected in parallel with each other and with the power source 45, a protector 51 connected in series with the heaters 7, and a step-down transformer 52 in parallel connection with the power source 45. A resistance 53 is connected in series with the secondary winding of the step-down transformer 52, while diodes 54, 55 and 56 connected in series wih each other are connected in parallel with the transformer 52. Resistances 57 and 58 are connected in series with the diodes 54, 55 and 56, with a resistance 59 connected in parallel with the resistances 57 and 58. A diode 60 and a resistance 61 are connected in series with the collector of a transistor 62 with the base of the transistor 62 connected to the junction of the resistances 57 and 58. A resistance 63 which is connected in series with a diode 64 is further connected to the collector of a transistor 66 through a resistance 65. The common junction of the emitters of the transistors 62 and 66 is connected to a resistance 67. The base of a transistor 68 is connected to the junction point of the resistance 63 and the diode 64. The heat-sensitive resistance element, such as the thermistor $R_1$ is connected to auxiliary resistances 69 and 70 which are connected in parallel with each other through the contact of the starting button 48. A resistance 71 which is in series connection with the thermistor $R_2$ is connected with the junction of the resistances 69 and 70, while the base of the transistor 66 is also connected to such junction. A diode 72 is connected to the collector of the transistor 68 and also connected to the gate terminal of a thyristor 75 through resistances 73 and 74. A capacitor 76 connected in parallel with the resistance 71 and the thermistor $R_2$ is also connected in parallel with a resistor 77. A relay 78 is connected in series with the thyristor 75 with a magnet 79 connected to the terminal of the relay 78. A diode 80 is connected in parallel with the relay 78. A resistor 81 is connected in series with diodes 82 and 83, while a capacitor 84 is connected in parallel with the thyristor 75.

In this arrangement, when the starting button 48 is put on, the starting button 47 is turned on, simultaneously with the button 48, and the motor 13, the heaters 7 and the control circuit described above are energized for starting the drying operation. As the drying operation proceeds, the values of resistance for the thermistors $R_1$ and $R_2$ vary and when a predetermined ratio $R_1/R_2$ is reached through the bridge circuit comprising the diodes 54, 55 and 56, the resistances 57, 58, and 59, thermistors $R_1$ and $R_2$, and the resistance 71 or the auxiliary resistances 69 and 70, the relay 78 is actuated to put off the starting buttons 47 and 48 through the magnet 79 for stopping the drying machine.

It should be noted here that since the voltage across the diodes 54, 55 and 56, series connection with each other which are connected to one end of the resistance 57 for the bridge circuit, is approximately constant regardless of the voltage variations of the power source, the value of $(V_1 + V_2)/V_3$ mentioned below varies depending on the variations of the power source voltage with consequent variations of the ratio $R_1/R_2$ for the thermistors $R_1$ and $R_2$, wherein $V_1$ is the voltage across the diodes 54, 55 and 56, $V_2$ is the voltage across one end of the resistance 57 and the base of the transistor 62, and $V_3$ is the voltage across the resistance 58.

In FIG. 8, the relation of $(V_1 + V_2)/V_3$ to various voltages can be obtained as follows on the assumption that the resistance 57 is 2.2kΩ and the resistance 58 is 2.2kΩ:

When $$V_1 + V_2 + V_3 = 6V,$$

$V_2 = 2.4V$ and
$V_3 = 2.4V$, since
$V_1 = 1.2V$ (constant).
Hence, $$(V_1 + V_2)/V_3 = (1.2V + 2.4V)/2.4V = 1.5$$

When $$V_1 + V_2 + V_3 = 5V,$$

$V_2 = 1.9V$ and
$V_3 = 1.9V$ since
$V_1 = 1.2V$ (constant).
Hence, $$(V_1 + V_2)/V_3 = (1.2V + 1.9V)/1.9V = 1.632$$

When $$V_1 + V_2 + V_3 = 4V$$

$V_2 = 1.4V$ and
$V_3 = 1.4V$, since
$V_1 = 1.2V$ (constant).
Hence, $$(V_1 + V_2)/V_3 = (1.2V + 1.4V)/1.4V = 1.857$$

As is clear from the above relation, the value of $(V_1 + V_2)/V_3$ can be decreased as the voltage rises, which means that from the characteristics of the bridge circuit, the ratio $R_1/R_2$ decreases as the power source voltage increases, and that the ratio $R_1/R_2$ can be lowered to the levels B and C (FIG. 7) with the increase of the power source voltage. Accordingly, the drying rate can be improved regardless of the variations of the power source voltage.

Figure 9:
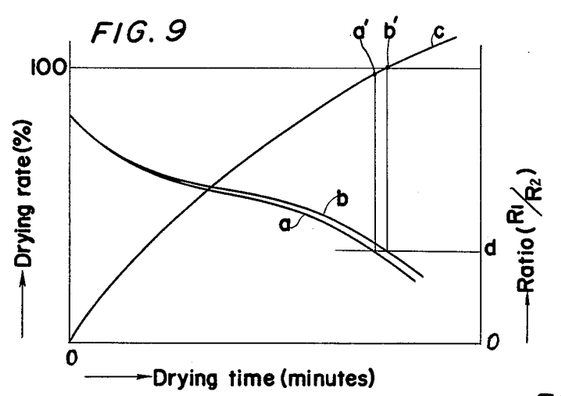
FIG. 9 is a graph showing the variation of the drying rate and the ratio of a first temperature sensing element to a second temperature sensing element.

Referring now to FIG. 9, there is shown the variation of the drying rate and the ratio $R_1/R_2$ for the thermistors $R_1$ and $R_2$, in which the drum 6 is comparatively heavily loaded with materials to be dried (2.0kg).

In FIG. 9, $c$ represents the curve of the drying rate, $a$ shows the curve of the ratio $R_1/R_2$ when the thermistor $R_1$ directly detects the temperature of the exhaust air, and $b$ is the curve of the ratio $R_1/R_2$ when the thermistor $R_1$ is molded in the insulating material 31 and attached to the outside wall of the fan casing 21 or enclosed in the baffle plate 28' of the drum 6. The point $d$ shows the operational ratio when the drying operation is finished. If comparison is made on the drying rates achieved when the thermistor $R_1$ is molded in the electrically insulating material 31 (10mm in thickness) and when the thermistor $R_1$ is not molded in such insulating material, the operational ratio $dx$ is constant irrespective of the presence of the molding, so that, when the drying rates at the operational ratio $d$ are compared, a drying rate of $a'$ (98 percent) for the curve $a$ with non-molded thermistor $R_1$ is achieved, while a drying rate of $b'$ (100 percent) for the curve $b$ with molded thermistor $R_1$ is obtained. In other words, since the mass of the temperature sensing portion 29 increases when the thermistor $R_1$ is molded in the insulating material 31, some of the heat to be detected by the thermistor $R_1$ is lost by the conduction toward the fan casing 21 or the baffle plate 28', by which fact a certain period of time is required before the thermistor $R_1$ reaches the predetermined exhaust temperature, resulting in the time difference as shown in FIG. 9.

Figure 10:
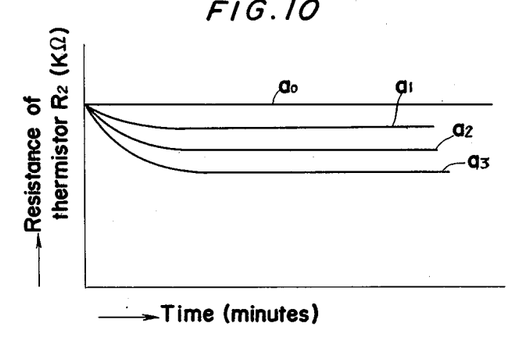
FIG. 10 is a graph showing the variation of resistance of a second temperature sensing element during operation.

Referring to FIG. 10, there is shown the variation of resistance of the thermistor $R_2$ during a drying operation.

In FIG. 10, the curve $a_0$ represents the resistance value of the thermistor $R_2$ when the thermistor $R_2$ is disposed so as to vary the resistance therof depending only on the ambient temperature, while the curves $a_1$, $a_2$, and $a_3$ show the variations of the resistance values when the thermistor $R_2$ is mounted on an elongated portion of the supporting frame 10 so that the resistance of the thermistor $R_2$ varies according to the ambient temperature and the temperature of the heaters 7. The curve $a_1$ shows the variation of the resistance value at the power source voltage of 85 volts, the curve $a_2$ at the power source voltage of 100 volts, and the curve $a_3$ at the power source voltage of 110 volts. It is to be noted that the resistance values for the curves $a_1$, $a_2$ and $a_3$ reach equilibrium in a very short period of time, i.e., in about 20 minutes after starting the drying operation. Since the operational ratio $d$ can be expressed in the relation $R_1/R_2$, the ratio $d$ is constant if the resistance value of the thermistor $R_2$ remains the same, and when the power source voltage rises with a sudden decrease of the resistance value of the thermistor $R_1$, the operational time is shortened with consequent insufficient drying. In the drying machine of the invention, in which the resistance value of the thermistor $R_2$ is decreased as the power source voltage increases under the condition where the resistance value of the thermistor $R_2$ has reached equilibrium as the ambient temperature for the thermistor $R_2$ increases after the temperature of the heaters 7 rises with the increase of the power source voltage, the time required to reach the operational ratio is lengthened as the voltage increases from the relation operational ratio $d = R_1/R_2$, and lowering of drying rate can be corrected.

Figure 11:
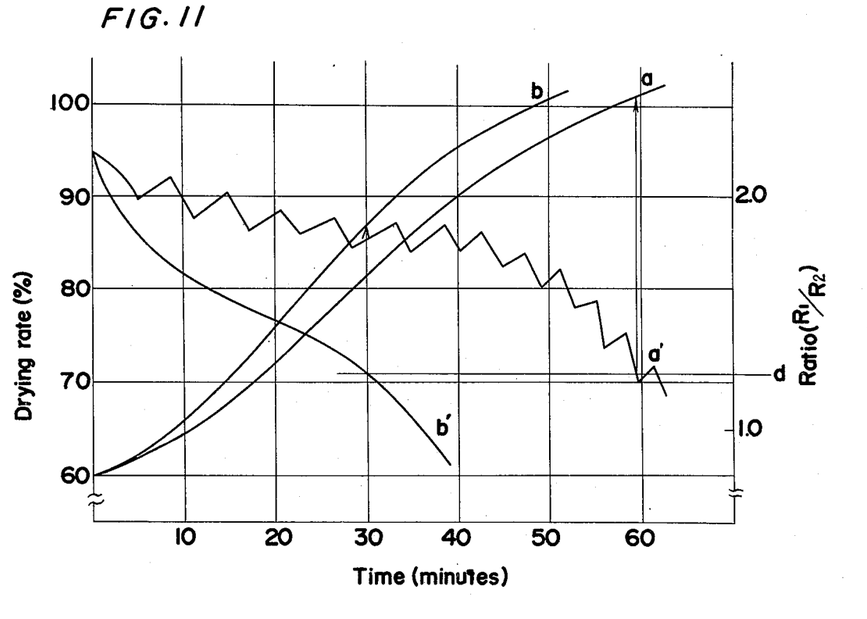
FIG. 11 is a graph showing the relation between the drying rate and the ratio of a first temperature sensing element to a second temperature sensing element including a delay thermostat.

Referring now to FIG. 11, there is shown the relation between the drying rate and the ratio $R_1/R_2$ including the delay thermostat 92 shown in FIG. 8.

Since the delay thermostat 92 for abnormal voltages and temperatures is connected in series with the heaters 7 in the circuit of FIG. 8, the thermostat 92 is repeatedly turned off and on if temperature rises to an abnormal level with the heaters 7 also turned off and on simultaneously, which results in re-appearance of the ratio curve $a'$, making it possible to obtain the predetermined drying rate curve $a$. In other words, the time required for the thermistors $R_1$ and $R_2$ to reach the predetermined operational ratio $d$ can be lengthened and consequently the predetermined drying rates can be achieved.

On the contrary, if the circuit in FIG. 8 is not provided with the delay thermostat 92, the variation of the ratio is very large as in the curve $b'$ and consequently causing insufficient drying at the stage of the operational ratio $d$ even though the rise of drying rate is rapid as in the curve $b$ of FIG. 11.

Furthermore, in the drying machine of the invention, the delay thermostat 12 for cool air is connected in parallel with the starting button 47, and the contact of the thermostat 12 which receives radiation heat from the heaters 7 is kept closed with atmospheric temperatures being over 40°C even after the starting buttons 47 and 48 are turned off, during which period only the motor 13 is rotated and consequently cool air is introduced into the drum 6. The cool air thus sucked into the machine lowers the atmospheric temperature for the delay thermostat 12 for cool air, and when the atmospheric temperature falls below 40°C, the contact of the thermostat 12 is opened and the motor 13 is stopped with the cool air flow also stopped. The object of incorporating the delay thermostat 12 is to prevent clothes or the like to be dried from wrinkling by providing an air flow for a long period of time when the room temperature and the voltage are high and for a comparatively short period of time when the room temperature and the voltage are at a low level. In the above arrangement, the atmospheric temperature for the cool air delay thermostat 12 is effectively utilized. In other words, when the room temperature and the voltage are high, the atmospheric temperature for the delay thermostat 12 is also high, and it naturally takes a certain period of time in order to lower the atmospheric temperature down to 40°C where the contact of the delay thermostat 12 is opened. On the contrary, when the room temperature is low with consequent low atmospheric temperature for the thermostat 12, the atmospheric temperature falls to 40°C in a short period of time, resulting in short time for cool air, which arrangement is effective for lowering the temperature of clothes or the like to be dried since air flow is introduced for a long period of time when the temperature of the materials to be dried is high and for a short period of time when the temperature of the same is low, and thus the finished condition of the dried materials can be always kept optimum irrespective of the fluctuation of the room temperature and the power source voltage.

Furthermore, in the drying machine of the present invention, since the auxiliary resistances 69 and 70 of different resistance values are connected in series with the thermistor $R_1$ incorporated in the bridge circuit as shown in FIG. 8 so that the resistances 69 and 70 are selectively switched over by the starting button 48, the operational resistance of the thermistor $R_1$ varies when the operational ratio of thermistor $R_1$ to $R_2$ is constant, by which fact it is possible to achieve a drying rate of 100 percent or to finish the drying operation with the materials to be dried in a somewhat damp condition by properly choosing the values of the resistances 69 and 70. The above arrangement is particularly effective for clothes or the like, for example, shirts or sheets etc., for which a finishing ironing operation may be desirable.

Additionally, apart from the heaters 7 to heat the air flow to be introduced into the drum 6, if an auxiliary heater 93 (shown in FIG. 8) is incorporated in parallel with the step-down transformer 52 with the thermistor $R_2$ which varies the resistance value thereof depending on the temperature of the outside air being disposed close to the heater 93, such unfavorable effect that the predetermined drying rate is not achieved by the fact that the amount of heat from the heaters 7 varies due to fluctuation of the amount of hot air sucked into the drum 6 when the materials to be dried are uniformly distributed or formed into a lump in the drum 6, or when the quality of materials to be dried is large or small, is advantageously eliminated.

It should be noted here that the elements to be used for the temperature sensing portions 29 and 32 are not limited to the thermistors $R_1$ and $R_2$, but may be any other temperature sensing elements, and that the positions to install these elements in the drying machine may be suitably altered so long as these serve the purpose of the present invention.

It should also be noted that the concept of the present invention may be applicable to any other machines or apparatuses such as ovens for permanent-press clothes or the like, wherein control of drying rates is essential.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A hot air drying machine for drying clothes or the like, said machine comprising:
   a drum rotatably provided in a housing and having an opening for receiving materials to be dried through a corresponding opening formed in said housing;
   a fan casing enclosing a rotatable fan therein and mounted in said housing, said fan casing communicating with said drum for air circulation therethrough and having an exhaust opening for discharging hot air out of said housing formed at an upper portion of said fan casing;
   means for simultaneously rotating said drum and said fan;
   heating means for heating outside air sucked into said housing through a suction opening formed in said housing;
   a first temperature sensing resistance element means for providing a first resistance value which varies according to the temperature of hot exhaust air through said drum and said fan casing;
   a second temperature sensing resistance element means for providing a second resistance value which varies according to the temperature of outside air sucked into said housing;
   means for completing a drying operation when an operational ratio of said first temperature sensing resistance element means to said second temperature sensing resistance element means reaches a predetermined level; and
   means for varying said operational ratio according to variations of power source voltage.

2. A hot air drying machine as claimed in claim 1, wherein said operational ratio varying means comprises a bridge circuit incorporating said first temperature sensing resistance element means and said second temperature sensing resistance element means, with a plurality of diodes inserted to an input side of said bridge circuit.

3. A hot air drying machine as claimed in claim 2, wherein said bridge circuit further includes a plurality of auxiliary resistances of different resistance values connected in series with said first and second temperature sensing resistance element means, with said auxiliary resistances being adapted to be selectively switched over for connection with said first and second temperature sensing resistance element means.

4. A hot air drying machine as claimed in claim 1, wherein said first temperature sensing resistance element means is enclosed in an electrically insulating material.

5. A hot air drying machine as claimed in claim 4, wherein said first temperature sensing resistance element means enclosed in said electrically insulating material is attached to an outer wall of said fan casing through said electrically insulating material.

6. A hot air drying machine as claimed in claim 4, wherein said first temperature sensing resistance element means enclosed in said electrically insulating material is attached to a baffle plate fixed in an inner periphery of said drum.

7. A hot air drying machine as claimed in claim 6, wherein said first temperature sensing resistance element means enclosed in said electrically insulating material and attached to said baffle plate is further covered by a covering plate means for protection of said first temperature sensing resistance element means.

8. A hot air drying machine as claimed in claim 1, wherein said second temperature sensing resistance element means is positioned closely adjacent said heating means for varying the resistance value of said second temperature sensing resistance element means according to the variations of the power source voltage.

9. A hot air drying machine as claimed in claim 1, further comprising a delay thermostat positioned closely adjacent said heating means for actuation of said delay thermostat when said power source voltage and the temperature of the outside air sucked into said housing rise to abnormally high levels.

10. A hot air drying machine as claimed in claim 1, further comprising an auxiliary heater spaced from said heating means for heating the outside air sucked into said housing, said second temperature sensing resistance element means being positioned closely adjacent said auxiliary heater.

11. A hot air drying machine as claimed in claim 1, further comprising a delay thermostat positioned closely adjacent said heating means, said delay thermostat being connected in parallel with a starting button which controls energization of said rotating means for said drum and of said heating means, said delay thermostat comprising means for maintaining said rotating means energized after said heating means has been de-energized and also for varying the time during which said rotating means is energized according to the variations of the power source voltage and the temperature of the outside air.

12. A hot air drying machine as claimed in claim 2, wherein said first temperature sensing resistance element means is enclosed in insulating material and is attached to an outer wall of said fan casing, and said second temperature sensing resistance element means is positioned closely adjacent said heating means.

* * * * *